(12) United States Patent
Dierksmeier et al.

(10) Patent No.: US 10,563,620 B2
(45) Date of Patent: Feb. 18, 2020

(54) EXPANDABLE EXHAUST CONE

(71) Applicants:Rolls-Royce Corporation, Indianapolis, IN (US); Rolls-Royce North American Technologies, Inc., Indianapolis, IN (US)

(72) Inventors: Douglas D. Dierksmeier, Franklin, IN (US); Edward C. Rice, Indianapolis, IN (US); Ryan C. Humes, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 870 days.

(21) Appl. No.: 15/236,047

(22) Filed: Aug. 12, 2016

(65) Prior Publication Data

US 2018/0045142 A1  Feb. 15, 2018

(51) Int. Cl.
*F02K 1/08* (2006.01)
*F02K 9/97* (2006.01)
*F42B 15/10* (2006.01)
*F02C 3/04* (2006.01)

(52) U.S. Cl.
CPC .............. *F02K 9/976* (2013.01); *F02C 3/04* (2013.01); *F02K 1/08* (2013.01); *F42B 15/10* (2013.01)

(58) Field of Classification Search
CPC ... F02K 1/04; F02K 1/08; F02K 1/085; F02K 1/06; B64D 33/04
See application file for complete search history.

(56) References Cited

U.S. PATENT DOCUMENTS

| | | | | |
|---|---|---|---|---|
| 2,408,099 A * | 9/1946 | Albert | .............. | F02K 1/08 239/265.19 |
| 2,637,972 A * | 5/1953 | Laucher | .............. | F02K 1/08 60/39.821 |
| 2,826,895 A * | 3/1958 | English | .............. | F01D 9/065 60/266 |
| 2,828,603 A * | 4/1958 | Laucher | .............. | F02K 1/08 239/265.27 |
| 3,068,312 A * | 12/1962 | Daley | .............. | H01M 2/0421 429/174 |
| 3,262,264 A * | 7/1966 | O'Neill | .............. | F02K 1/08 239/127.3 |
| 3,972,475 A | 8/1976 | Nelson | | |
| 4,244,294 A * | 1/1981 | Frignac | .............. | F02K 1/08 102/374 |
| 4,527,388 A * | 7/1985 | Wallace, Jr. | .............. | F02K 1/09 239/265.19 |
| 5,141,154 A | 8/1992 | Barcza | | |
| 5,813,609 A | 9/1998 | Ellerhorst et al. | | |
| 6,058,846 A * | 5/2000 | Boyd | .............. | F02C 7/042 102/374 |
| 2001/0045093 A1* | 11/2001 | Jacobson | .............. | F01D 1/30 60/602 |
| 2005/0060984 A1 | 3/2005 | Prouteau et al. | | |
| 2015/0048177 A1 | 2/2015 | Akatsuka et al. | | |

* cited by examiner

*Primary Examiner* — Gerald L Sung
(74) *Attorney, Agent, or Firm* — Barnes & Thornburg LLP

(57) ABSTRACT

An expandable exhaust cone assembly is described which is able to move from a collapsed position to an expanded position.

19 Claims, 6 Drawing Sheets

EXPANDABLE EXHAUST CONE

FIELD OF THE DISCLOSURE

The present disclosure relates generally to gas turbine engines, and more specifically to exhaust systems for gas turbine engines.

BACKGROUND

Gas turbine engines are used to provide thrust for air vehicles. For example gas turbine engines are used to propel planes, helicopters, cruise missiles, and the like. In many gas turbine engines implemented as part of an air vehicle, an exhaust system is used to discharge gasses after they pass through the engine. Such exhaust systems can include an exhaust cone that influences the flow of gasses moving through the exhaust system.

SUMMARY

The present disclosure may comprise one or more of the following features and combinations thereof.

An expandable exhaust cone assembly adapted for use in an associated gas turbine engine is disclosed in this paper. The expandable exhaust cone assembly may include a fixed cone segment, a plurality of movable cone segments, and a cone mover. The fixed cone segment may be arranged around a central axis. The fixed cone segment may be adapted to be mounted to a structural component of the gas turbine engine.

The plurality of movable cone segments may be configured to move from a collapsed position to an expanded position. The collapsed position may be associated with a first overall length of the expandable exhaust cone along the central axis. The expanded position may be associated with a second overall length of the expandable exhaust cone along the central axis that is longer than the first length. Each of the plurality of movable cone segments may be nested within the fixed cone segment when the expandable exhaust cone assembly is in the collapsed position. Each of the plurality of movable cone segments may be arranged to extend outward of the fixed cone segment along the central axis when the expandable exhaust cone assembly is in the expanded position. The cone mover may be configured to drive the plurality of movable cone segments from the collapsed position to the expanded position in response to startup of the gas turbine engine.

In some embodiments, the cone mover may include a threaded plate and a mover rod. The threaded plate may be fixed relative to the fixed cone segment. The mover rod may be adapted to be coupled to a turbine rotor for rotation therewith. The mover rod may include a threaded portion that engages threads of the threaded plate. The mover rod may be coupled to the plurality of movable cone segments so that the mover rod is configured to drive the plurality of movable cone segments to the expanded position in response to rotation of the turbine rotor. The cone mover may also include an end cap that defines the end of the expandable exhaust cone assembly. The end cap may not engage the threaded portion of the mover rod so that the end cap is configured to allow rotation of the mover rod relative to the end cap.

In some embodiments, the cone mover may include an expandable substantially airtight tube that has an internal volume smaller than an internal volume of the expandable exhaust cone assembly. The expandable substantially airtight tube may be coupled to the plurality of movable cone segments. The expandable substantially airtight tube may be adapted to be coupled to a pressure source. The expandable substantially airtight tube may be configured to drive the plurality of movable cone segments to the expanded position in response to a pressure increase within the expandable substantially airtight tube.

In some embodiments, the cone mover may include a lip and a non-expandable tube. The lip may be coupled to the expandable substantially airtight tube. The non-expandable tube may be fixed relative to the fixed cone segment. The non-expandable tube may have an internal volume smaller than the internal volume of the expandable substantially airtight tube. The non-expandable tube may have a sealable opening. The non-expandable tube may be adapted to be coupled to the pressure source. The non-expandable tube may be configured to further drive the plurality of movable cone segments to the expanded position by being sealed by the lip and being released of the seal. The release of the seal may occur upon reaching a predetermined pressure value within the non-expandable tube in response to a pressure increase within the non-expandable tube from the pressure source.

In some embodiments, the cone mover may include a pressure relief mechanism. The pressure relief mechanism may be configured to vent gas when pressure in the expandable substantially airtight tube exceeds a predetermined value. The pressure relief mechanism may be one of a pressure relief valve and a rupture disk.

In some embodiments, the cone mover may include a pressure source coupled to a cavity. The cavity may have a variable volume. The boundaries of the cavity may be created in part by the plurality of movable cone segments. The pressure source may be configured to drive the plurality of movable cone segments to the expanded position in response to a pressure increase within the cavity.

In some embodiments, the pressure source may be selected from one of a gas from bypass air, a gas from exhaust air, and a gas from a pyrotechnic charge. The pyrotechnic charge may be coupled to the associated gas turbine engine so that the pyrotechnic charge is configured to initiate startup the associated gas turbine engine.

According to another aspect of the present disclosure, a cruise missile may include a fuel supply tank, a gas turbine engine, and an expandable exhaust cone assembly. The gas turbine engine may include a compressor assembly, a combustor assembly, and a turbine assembly. The turbine assembly may include a case and a rotor. The rotor may be mounted in the case to rotate relative to the case.

In some embodiments, the expandable exhaust cone assembly may include a fixed cone segment, a plurality of movable cone segments, and a cone mover. The fixed cone segment may be arranged around a central axis. The fixed cone segment may be adapted to be mounted to a structural component of the gas turbine engine.

The plurality of movable cone segments may be configured to move from a collapsed position to an expanded position. The collapsed position may be associated with a first overall length of the expandable exhaust cone along the central axis. The expanded position may be associated with a second overall length of the expandable exhaust cone along the central axis that is longer than the first length. The cone mover may be configured to drive the plurality of movable cone segments from the collapsed position to the expanded position in response to startup of the gas turbine engine.

In some embodiments, the cone mover may include a threaded plate and a mover rod. The threaded plate may be fixed relative to the fixed cone segment. The mover rod may be adapted to be coupled to the rotor for rotation therewith. The mover rod may include a threaded portion that engages threads of the threaded plate. The mover rod may be coupled to the plurality of movable cone segments so that the mover rod is configured to drive the plurality of movable cone segments to the expanded position in response to rotation of the rotor. The cone mover may also include an end cap that defines the end of the expandable exhaust cone assembly. The end cap may not engage the threaded portion of the mover rod so that the end cap is configured to allow rotation of the mover rod relative to the end cap.

In some embodiments, the cone mover may include an expandable substantially airtight tube that has an internal volume smaller than an internal volume of the expandable exhaust cone assembly. The expandable substantially airtight tube may be coupled to the plurality of movable cone segments. The expandable substantially airtight tube may be adapted to be coupled to a pressure source. The expandable substantially airtight tube may be configured to drive the plurality of movable cone segments to the expanded position in response to a pressure increase within the expandable substantially airtight tube.

In some embodiments, the cone mover may include a lip and a non-expandable tube. The lip may be coupled to the expandable substantially airtight tube. The non-expandable tube may be fixed relative to the fixed cone segment. The non-expandable tube may have an internal volume smaller than the internal volume of the expandable substantially airtight tube. The non-expandable tube may have a sealable opening. The non-expandable tube may be adapted to be coupled to the pressure source. The non-expandable tube may be configured to further drive the plurality of movable cone segments to the expanded position by being sealed by the lip and being released of the seal. The release of the seal may occur upon reaching a predetermined pressure value within the non-expandable tube in response to a pressure increase within the non-expandable tube from the pressure source.

In some embodiments, the cone mover may include a pressure relief mechanism. The pressure relief mechanism may be configured to vent gas when pressure in the expandable substantially airtight tube exceeds a predetermined value. The pressure relief mechanism may be one of a pressure relief valve and a rupture disk.

In some embodiments, the pressure source may be selected from one of a gas from bypass air, a gas from exhaust air, or a gas from a pyrotechnic charge. The pyrotechnic charge may be coupled to the rotor so that the pyrotechnic charge is configured to initiate rotation of the rotor to start the gas turbine engine.

In some embodiments, the cone mover may include a pressure source coupled to a cavity. The cavity may have a variable volume. The boundaries of the cavity may be created in part by the plurality of movable cone segments. The pressure source may be configured to drive the plurality of movable cone segments to the expanded position in response to a pressure increase within the cavity.

A method of using a cruise missile is also disclosed in this paper. The method of using a cruise missile may include stowing the cruise missile within an internal weapons bay of an aircraft, deploying the cruise missile from the internal weapons bay of the aircraft, and moving an expandable exhaust cone assembly from a collapsed position to an expanded position after deploying the cruise missile from the internal weapons bay of the aircraft.

The cruise missile may comprise a gas turbine engine including an expandable exhaust cone assembly. The expandable exhaust cone assembly may be configured to move from a collapsed position to an expanded position. The collapsed position may be associated with a first overall length of the expandable exhaust cone along a central axis. The expanded position may be associated with a second overall length of the expandable exhaust cone along the central axis that is longer than the first length.

In some embodiments, the method may comprise moving the expandable exhaust cone assembly in response to rotation of a turbine rotor included in the gas turbine engine. The method may comprise moving the expandable exhaust cone assembly in response to a pressure increase within an expandable substantially airtight tube. The expandable substantially airtight tube may be included in the expandable exhaust cone assembly. The method may comprise moving the expandable exhaust cone assembly in response to a pressure increase within a cavity. The cavity may have a variable volume. The boundaries of the cavity may be created in part by the expandable exhaust cone assembly.

A method of making a cruise missile is also disclosed in this paper. The method of making a cruise missile may include mounting a fixed cone segment to a structural component of a gas turbine engine, coupling a plurality of movable cone segments to the fixed cone segment, and coupling a cone mover to the plurality of movable cone segments. The gas turbine engine may be included in the cruise missile.

The plurality of movable cone segments may be configured to move from a collapsed position to an expanded position. The collapsed position may be associated with a first overall length of the cruise missile along a central axis. The expanded position may be associated with a second overall length of the cruise missile along the central axis that is longer than the first length. The cone mover may be configured to drive the plurality of movable cone segments from the collapsed position to the expanded position in response to startup of the gas turbine engine.

In some embodiments, the method may further include using a cone mover that may include a threaded plate and a mover rod. The threaded plate may be fixed relative to the fixed cone segment. The mover rod may be adapted to be coupled to a rotor included in the gas turbine engine for rotation therewith. The mover rod may include a threaded portion that engages threads of the threaded plate. The mover rod may be coupled to the plurality of movable cone segments so that the mover rod is configured to drive the plurality of movable cone segments to the expanded position in response to rotation of the rotor.

In some embodiments, the method may further include using a cone mover that may include an expandable substantially airtight tube that has an internal volume smaller than an internal volume of the expandable exhaust cone assembly. The expandable substantially airtight tube may be coupled to the plurality of movable cone segments. The expandable substantially airtight tube may be adapted to be coupled to a pressure source. The expandable substantially airtight tube may be configured to drive the plurality of movable cone segments to the expanded position in response to a pressure increase within the expandable substantially airtight tube.

In some embodiments, the method may further include using a cone mover that may include a pressure source coupled to a cavity. The cavity may have a variable volume.

The boundaries of the cavity may be created in part by the plurality of movable cone segments. The pressure source may be configured to drive the plurality of movable cone segments to the expanded position in response to a pressure increase within the cavity.

These and other features of the present disclosure will become more apparent from the following description of the illustrative embodiments.

DETAILED DESCRIPTION OF THE DRAWINGS

Figure 1:
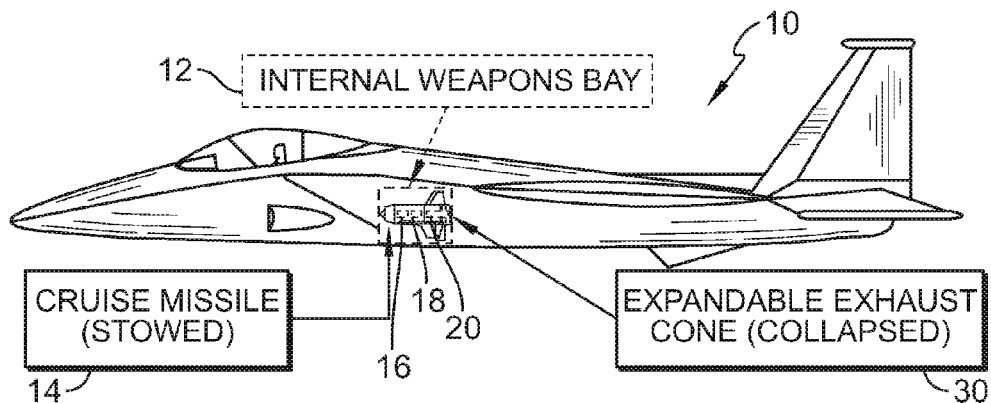
FIG. 1 is a side elevation view of an aircraft showing diagrammatically that the aircraft includes an internal weapons bay that may stow a cruise missile and showing that the missile may only fit in the internal weapons bay if the missile includes an expandable exhaust cone assembly that is collapsed for transport.

For the purposes of promoting an understanding of the principles of the disclosure, reference will now be made to a number of illustrative embodiments illustrated in the drawings and specific language will be used to describe the same.

The illustrative aircraft 10 includes an internal weapons bay 12 that stows a cruise missile 14 as shown in FIG. 1. The internal weapons bay 12 has limited space. Features of the missile 14 from the internal weapons bay 12 cannot extend out of the weapons bay 12 when the missile 14 is stowed in the aircraft 10. A decrease in the size of a component of the missile 14 may be desired to allow storage in the weapons bay 12. Decreasing the size of certain components of the missile 14 may cause adverse effects. For example decreasing the volume of a fuel supply tank 18 can have the adverse effect of decreasing missile 14 range.

Figure 2:
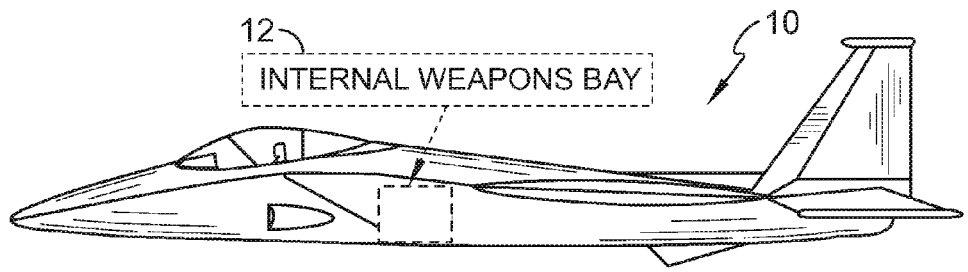
FIG. 2 is a side elevation view of the aircraft and the cruise missile of FIG. 1 showing diagrammatically that the expandable exhaust cone assembly may be expanded upon deployment of the missile for independent flight.
Figure 2:
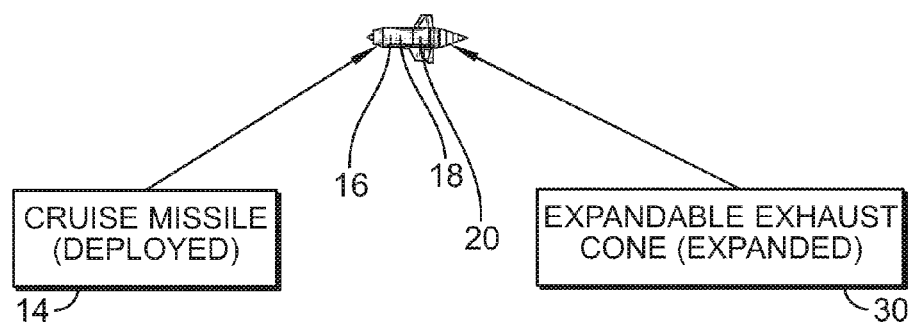
Figure 3:
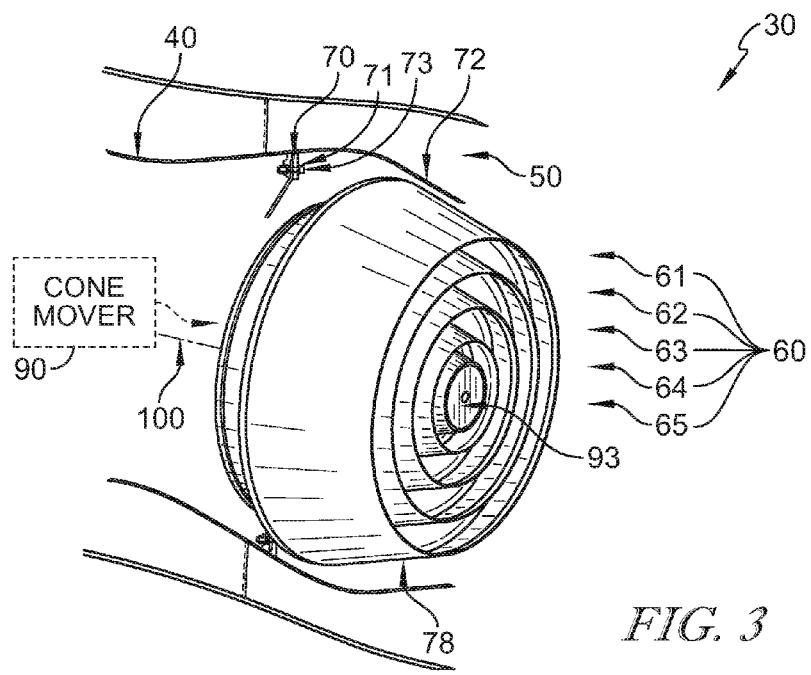
FIG. 3 is a perspective view of the expandable exhaust cone assembly that may be used in the cruise missile of FIGS. 1 and 2 illustrating the assembly in the collapsed position.
Figure 4:
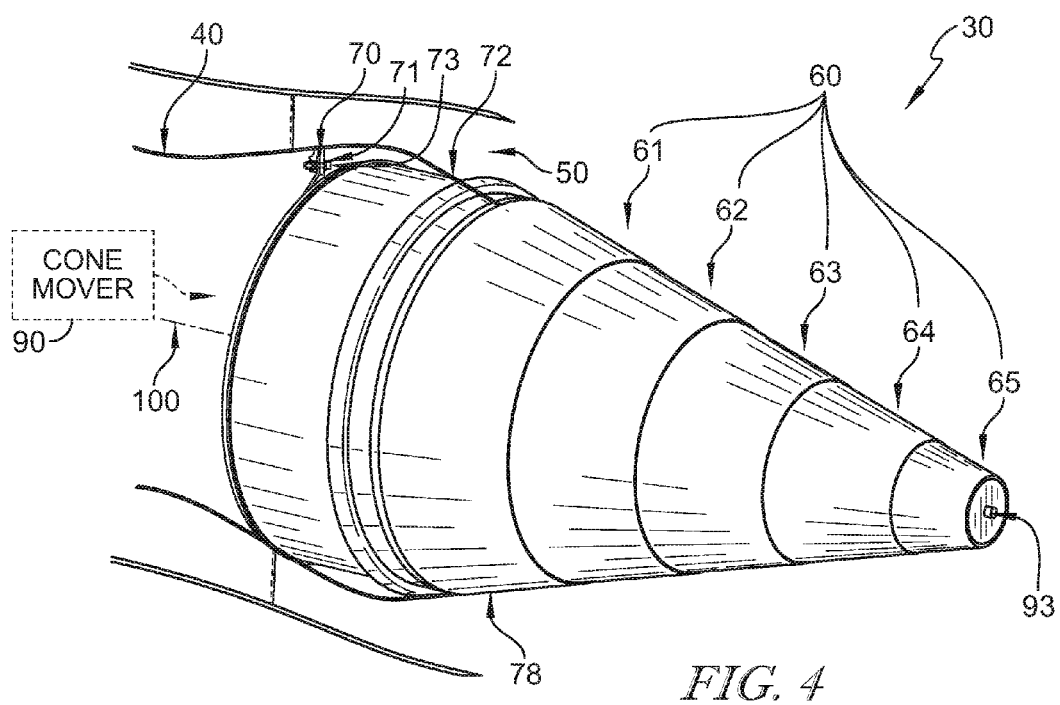
FIG. 4 is a perspective view of the expandable exhaust cone assembly of FIG. 3 illustrating the assembly in the expanded position.

The cruise missile 14 includes a payload of explosive material 16, a fuel supply tank 18, and a gas turbine engine 20 as suggested in FIGS. 1 and 2. The gas turbine engine 20 includes an expandable exhaust cone assembly 30 that allows for a reduced overall length of the missile 14 when stowed in the aircraft 10. Combustion reaction gasses generated by the gas turbine engine 20 provide thrust. The exhaust cone 30 influences the flow of the combustion reaction gasses as the gasses are discharged from the gas turbine engine 20. Influencing the flow of the combustion reaction gasses can provide a steady flight path for the missile 14.

As shown in FIGS. 1-4 the expandable exhaust cone assembly 30 is movable from a collapsed to an expanded position. The expandable exhaust cone assembly 30 influences the flow of combustion reaction gasses when the assembly 30 is in the expanded position. The expandable exhaust cone assembly 30 shortens the illustrative cruise missile 14 when the assembly 30 is in the collapsed position. The cruise missile 14 is better able to fit in the internal weapons bay 12 when the expandable exhaust cone assembly 30 is in the collapsed position. Shortening the cruise missile 14 may prevent the need to decrease the size of other components of the missile 14, thereby avoiding potential adverse effects.

Figure 5:
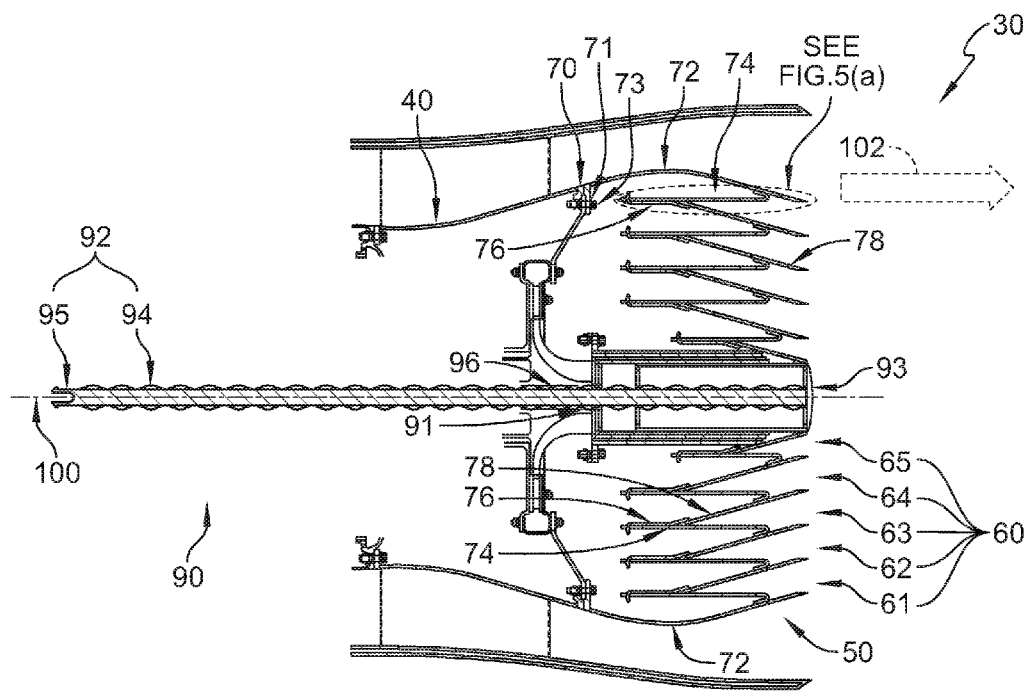
FIG. 5 is a cross-sectional view of an expandable exhaust cone assembly in the collapsed position showing that the assembly includes a fixed cone segment, a plurality of movable cone segments, and a cone mover that includes a threaded plate and a mover rod and showing diagrammatically that the mover rod is coupled to a turbine rotor so that the mover rod drives the plurality of movable cone segments to the expanded position in response to rotation of the turbine rotor.
Figure 6:
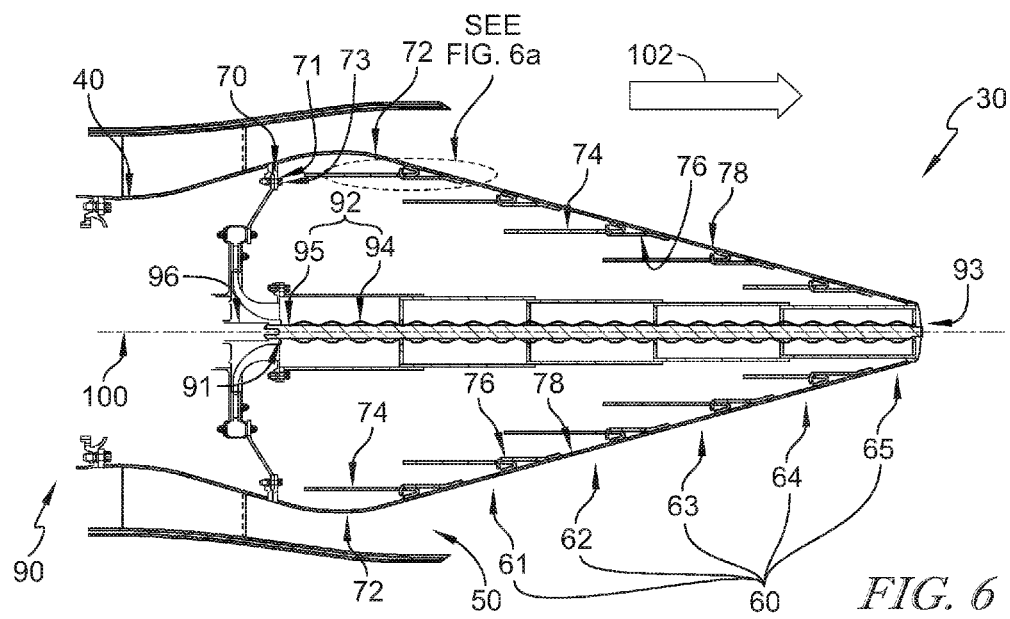
FIG. 6 is a cross-sectional view of the expandable exhaust cone assembly of FIG. 5 in the expanded position.

The expandable exhaust cone assembly 30 includes a fixed cone segment 50, a plurality of movable cone segments 60, and a cone mover 90 as shown in FIGS. 5 and 6. The fixed cone segment 50 is mounted to a structural component 40 of the gas turbine engine 20 in order to support the plurality of movable cone segments 60. The movable cone segments 60 are coupled to the fixed cone segment 50 to slide along a central axis 100 relative to the fixed cone segment 50. The cone mover 90 is configured to drive sliding movement of the movable cone segments 60 as suggested by arrow 102 in FIGS. 5 and 6.

As shown in FIGS. 5 and 6 the fixed cone segment 50 wraps around a central axis 100 and supports movement of the movable cone segments 60 from the collapsed to the expanded position. The fixed cone segment 50 includes a mounting portion 70, a curved outer portion 72, and a slide support ring 74. The mounting portion 70 includes holes 71 that support fasteners 73 and is adapted to mount to the structural component 40 of the gas turbine engine 20. The curved outer portion 72 curves radially outward and provides an outer surface of the exhaust cone 30. The slide support ring 74 extends axially from near an aft end of the curved outer portion 72. The slide support ring 74 guides movement of an adjacent movable cone segment 61 that is nested radially inward of the fixed cone segment 50.

The plurality of movable cone segments 60 includes intermediate cone segments 61, 62, 63, 64 and an end cone segment 65. In the collapsed position the intermediate cone segments 61, 62, 63, 64 are nested within the fixed cone segment 50 and the end cone segment 65. As shown in FIGS. 5 and 6 the intermediate cone segments 61, 62, 63, 64 move from the collapsed position to the expanded position to form a generally frustoconical shape. Each of the intermediate cone segments 61, 62, 63, 64 includes a connector portion 76, an outer portion 78, and a slide support ring 74. The connector portion 76 connects to a slide support ring 74 of an adjacent cone segment located radially outward of the connector portion 76. The connector portion 76 allows an intermediate cone segment 61, 62, 63, 64 to slide from the collapsed to the expanded position. The outer portion 78 provides an outer surface of the exhaust cone 30. The slide support ring 74 extends axially from near an aft end of the outer portion 78. The slide support ring 74 guides movement of an adjacent movable cone segment that is nested radially inward of the slide support ring 74. The connector portion 76, the outer portion 78, and the slide support ring 74 are scaled to accommodate nesting of the intermediate cone segments 61, 62, 63, 64.

As shown in FIG. 5 the end cone segment 65 is nested radially inward of the intermediate cone segments 61, 62, 63, 64 when the exhaust cone 30 is in the collapsed position. The end cone segment 65 slides from the collapsed position to the expanded position to further form a frustoconical shape as suggested by FIGS. 5 and 6. The end cone segment 65 includes a connector portion 76 and an outer portion 78. The connector portion 76 engages a slide support ring 74 of an adjacent intermediate cone segment 64. The connector portion 76 allows the end cone segment 65 to slide from the collapsed to the expanded position. The outer portion 78 provides an outer surface of the exhaust cone 30. The connector portion 76 and the outer portion 78 of the end cone segment 65 are scaled to accommodate the size of the end cone segment 65.

Figure 5A:
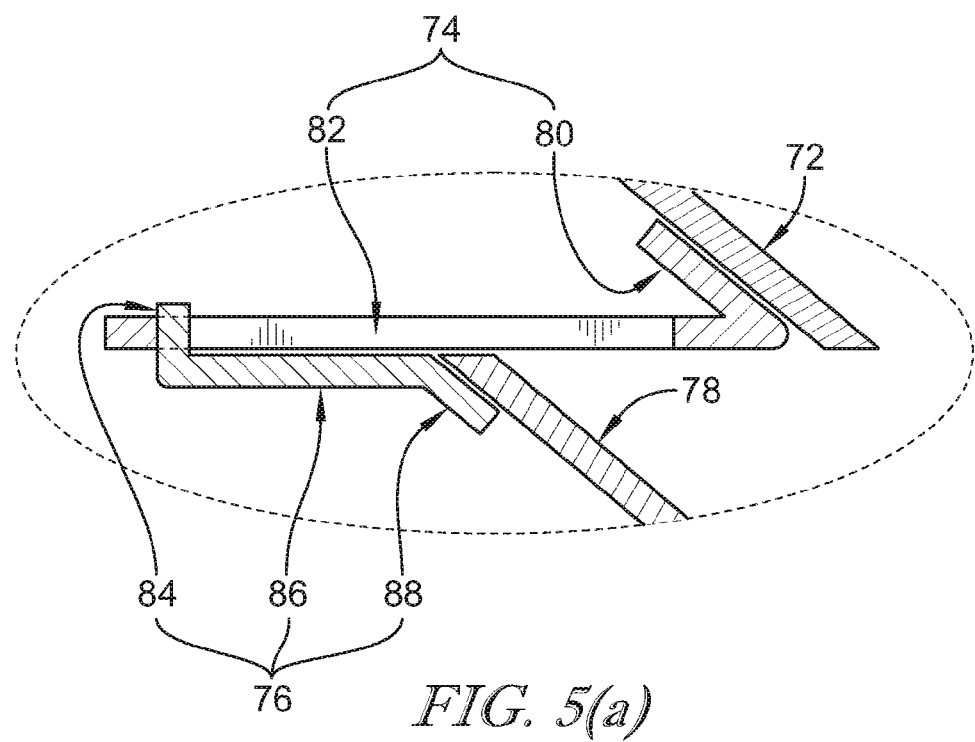
FIG. 5(a) is a detail view showing an enlarged portion of FIG. 5.
Figure 6A:
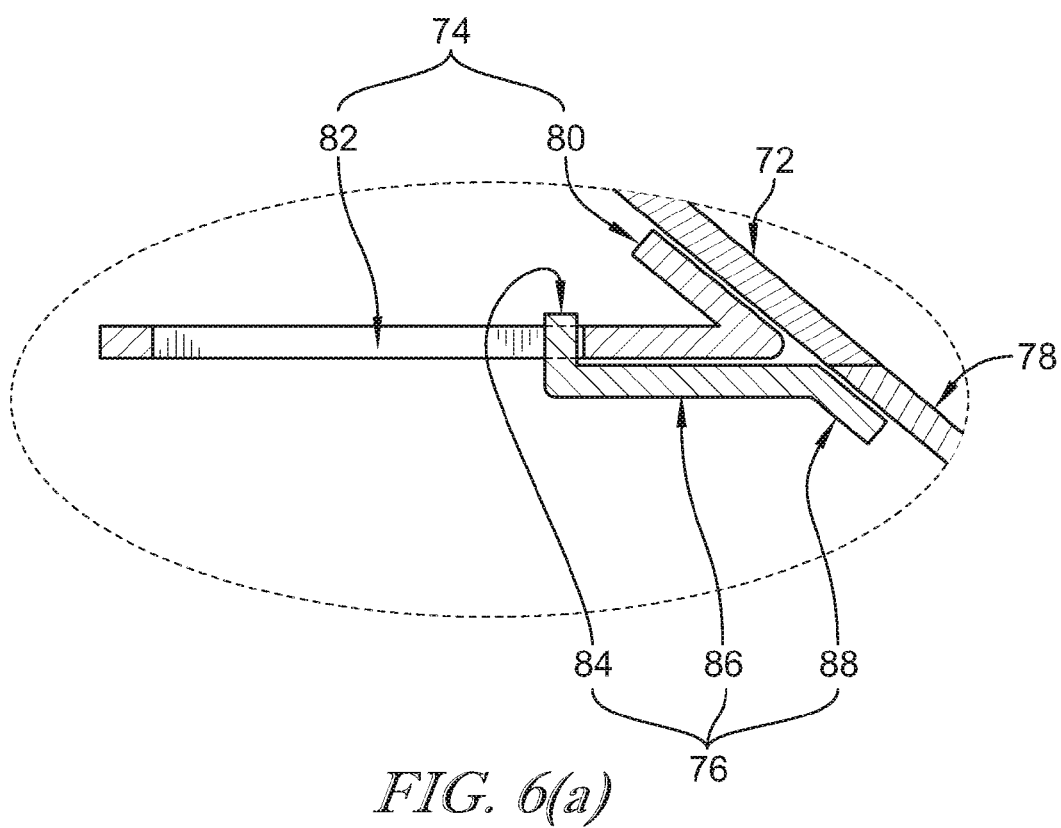
FIG. 6a is a detail view showing an enlarged portion of FIG. 6.

The fixed cone segment 50 and the intermediate cone segments 61, 62, 63, 64 include slide support rings 74 as shown in FIGS. 5 and 6. Slide support rings 74 guide sliding movement of an adjacent movable cone segment nested radially inward of the slide support ring 74. As shown in FIGS. 5(a) and 6(a) each slide support ring 74 includes an attachment portion 80 and slots 82. The attachment portion 80 attaches to an outer portion 72, 78 to support axial extension of the slide support ring 74. The slots 82 run axially along the slide support ring 74. The slots 82 guide a connector portion 76 that engages the slide support ring 74 and prevent overextension when the movable cone segments 60 slide to the expanded position.

As shown in FIGS. 5 and 6 the movable cone segments 60 include connector portions 76. The connector portions 76 allow the movable cone segments 60 to connect to an adjacent slide support ring 74 and slide to the expanded position. Each connector portion 76 includes tangs 84, a guiding ring 86, and a connector ring 88 as shown in FIGS. 5(a) and 6(a). The tangs 84 extend radially outward and engage the slots 82 of an adjacent slide support ring 74. The tangs 84 slide from a forward end to an aft end of the slots 82. Overextension of the outer portion 78 is prevented when the tangs 84 reach an aft end of the slots 82. The guiding ring 86 is located radially inward of an adjacent slide support ring 74 that engages the tangs 84. The guiding rings 86 support axial movement of the tangs 84 and prevent the tangs 84 from disengaging the slots 82. The connector ring 88 connects the connector portion 76 to the outer portion 78. The connector ring 88 supports sliding movement of the outer portion 78 as the tangs 84 slide along the slots 82.

The exhaust cone assembly 30 includes a cone mover 90 configured to drive the exhaust cone 30 from the collapsed to the expanded position as suggested in FIGS. 5 and 6. The cone mover 90 illustratively includes a threaded plate 91, a mover rod 92, and an end cap 93. The threaded plate 91 is fixed relative to the fixed cone segment 50 and supports movement of the mover rod 92. The mover rod 92 responds to rotation of a turbine rotor 96 to drive the movable cone segments 60. The end cap 93 does not engage threads of the mover rod 92 so that the mover rod 92 rotates relative to the end cap 93.

As shown in FIGS. 5 and 6 the mover rod 92 is coupled to the plurality of movable cone segments 60 and a turbine rotor 96. The mover rod 92 includes a threaded portion 94 and an unthreaded portion 95. The threaded portion 94 of the mover rod 92 engages threads of the threaded plate 91 when the exhaust cone 30 is in the collapsed position. The mover rod 92 rotates in response to rotation of the rotor 96 upon startup of the gas turbine engine 20 which drives the movable cone segments 60 axially to the expanded position. The mover rod 92 spins freely without axial movement when the exhaust cone 30 reaches the expanded position because the threaded portion 94 disengages the threaded plate 91.

A method of using a cruise missile 14 is suggested in FIGS. 1 and 2. The cruise missile 14 is stowed within the internal weapons bay 12 of the aircraft 10 as shown in FIG. 1. The expandable exhaust cone 30 of the missile 14 is in the collapsed position when the missile 14 is stowed. As shown in FIG. 2 the expandable exhaust cone 30 of the missile 14 moves to the expanded position after being deployed from the internal weapons bay 12. The expandable exhaust cone 30 is moved to the expanded position in response to rotation of the turbine rotor 96 as shown in FIGS. 5 and 6.

Figure 7:
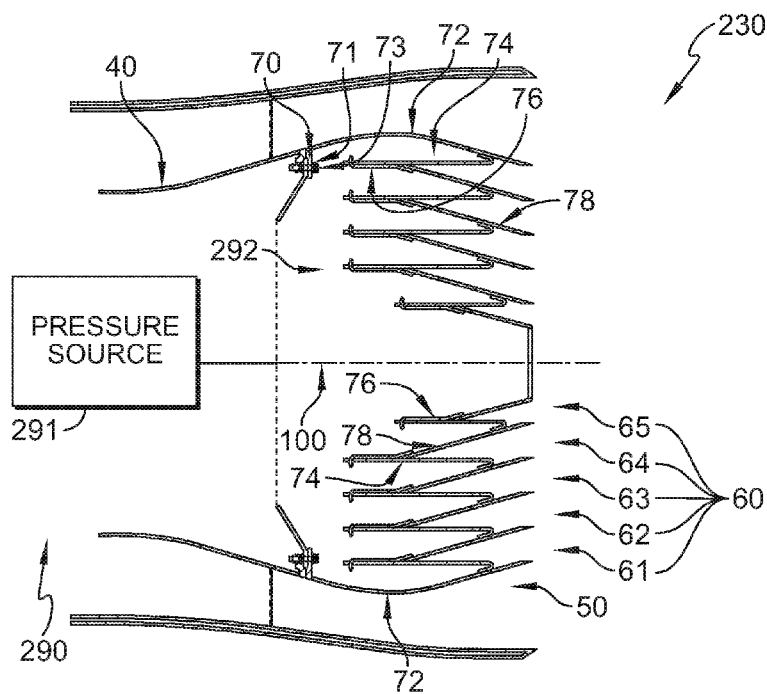
FIG. 7 is a cross-sectional view of an expandable exhaust cone assembly in the collapsed position showing diagrammatically that the assembly includes a fixed cone segment, a plurality of movable cone segments, and a cone mover that includes a pressure source coupled to a cavity so that the plurality of movable cone segments are driven to the expanded position in response to a pressure increase within the cavity.
Figure 8:
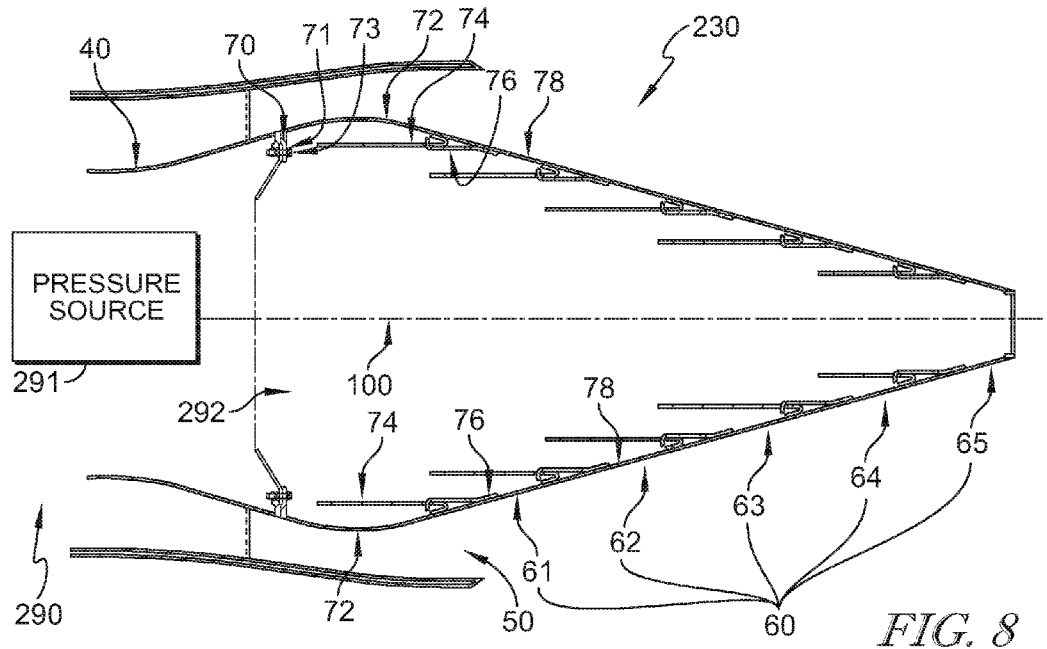
FIG. 8 is a cross-sectional view of the expandable exhaust cone assembly of FIG. 7 in the expanded position.

Another expandable exhaust cone assembly 230, as shown in FIGS. 7 and 8, incorporates a second cone mover 290 in place of cone mover 90 shown in FIGS. 3-6. The cone mover 290 includes a pressure source 291 coupled to a cavity 292. The boundaries of the cavity 292 are created in part by the plurality of movable cone segments 60. The pressure source 291 is configured to increase pressure within the cavity 292 to a predetermined value. The predetermined pressure is sufficient to drive the movable cone segments 60 to the expanded position.

FIGS. 7 and 8 suggest another method of using a cruise missile 14. After the missile 14 is deployed the expandable exhaust cone 230 of the missile 14 moves from the collapsed to the expanded position in response to a pressure increase within the cavity 292.

Figure 9:
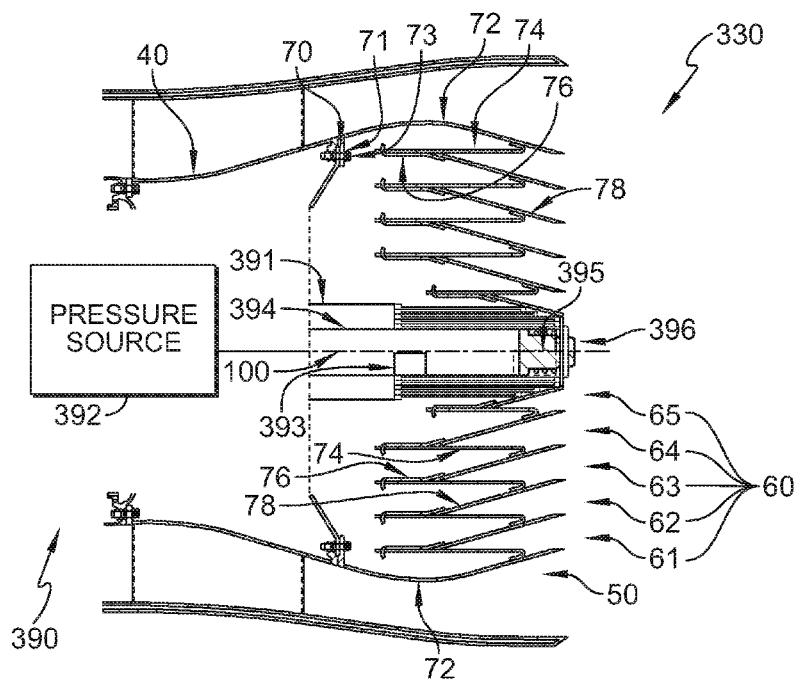
FIG. 9 is a cross-sectional view of an expandable exhaust cone assembly in the collapsed position showing that the assembly includes a fixed cone segment, a plurality of movable cone segments, and a cone mover that includes an expandable substantially airtight tube and optionally a non-expandable tube including a sealable opening, a lip coupled to the expandable substantially airtight tube, and a pressure relief mechanism, and showing diagrammatically that the expandable substantially airtight tube and the non-expandable tube are coupled to a pressure source so that the plurality of movable cone segments are driven to the expanded position in response to a pressure increase within the expandable substantially airtight tube and the non-expandable tube.
Figure 10:
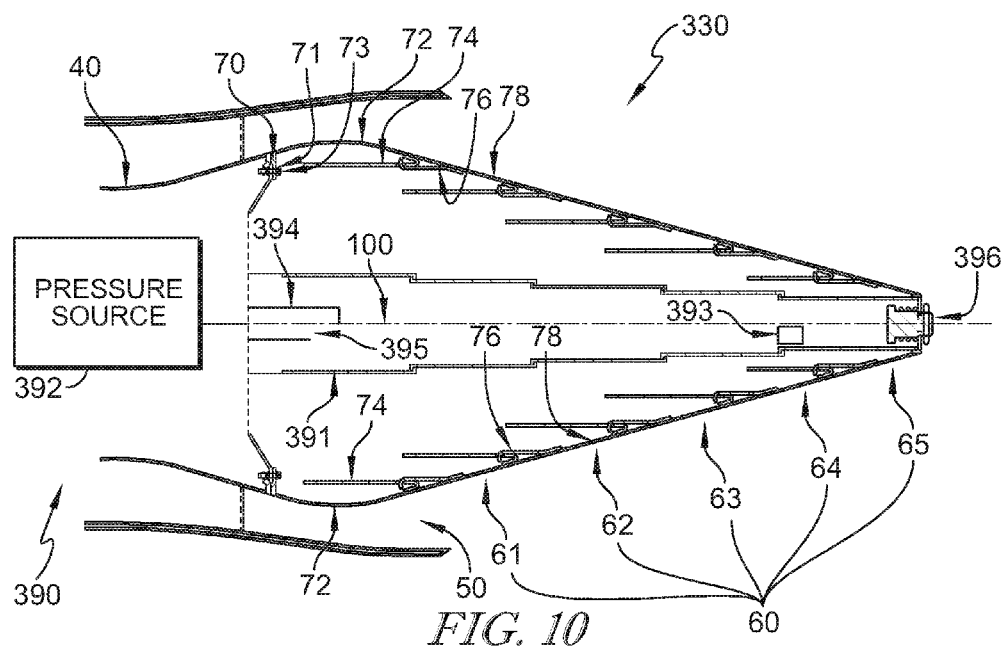
FIG. 10 is a cross-sectional view of the expandable exhaust cone assembly of FIG. 9 in the expanded position.

FIGS. 9 and 10 show an expandable exhaust cone assembly 330 that incorporates a third cone mover 390 in place of cone mover 90 shown in FIGS. 3-6 and cone mover 290 shown in FIGS. 7 and 8. The cone mover 390 includes an expandable substantially airtight tube 391 coupled to a pressure source 392 and to the movable cone segments 60. The expandable substantially airtight tube 391 has an internal volume smaller than an internal volume of the exhaust cone assembly 330. The expandable substantially airtight tube 391 is configured to drive the movable cone segments 60 outward along the central axis 100 in response to an increase in pressure in the expandable substantially airtight tube 391. The pressure source 392 is configured to increase the pressure within the expandable substantially airtight tube 391 to a predetermined value. The predetermined pressure is sufficient to drive the movable cone segments 60 to the expanded position.

The cone mover 390 shown in FIGS. 9 and 10 optionally includes a lip 393 and a non-expandable tube 394. The lip 393 is coupled to the expandable substantially airtight tube 391. The non-expandable tube 394 is fixed relative to the fixed cone segment 50. The non-expandable tube 394 has an internal volume smaller than the internal volume of the expandable substantially airtight tube 391.

The lip 393 and the non-expandable tube 394 further drive the movable cone segments 60. The non-expandable tube 394 has a sealable opening 395. The non-expandable tube 394 is coupled to the pressure source 392. In response to a pressure increase the expandable substantially airtight tube 391 expands until the lip 393 seals the non-expandable tube 394. Pressure then increases within the non-expandable tube 394. When a predetermined pressure value is reached within the non-expandable tube 394, the lip 393 is released. The movable cone segments 60 are forced axially outward by the release of the lip 393 and the subsequent increase in pressure within the expandable substantially airtight tube 391.

The cone mover 390 shown in FIGS. 9 and 10 also optionally includes a pressure relief mechanism 396. The pressure relief mechanism 396 may be a pressure relief valve, a rupture disk, or another component able to relieve pressure. Preferably the pressure relief mechanism 396 is configured to vent gas when pressure in the expandable substantially airtight tube 391 exceeds a predetermined value. The venting of gas can prevent rupture of the expandable exhaust cone assembly 330 or other adverse effects of excess pressure.

FIGS. 9 and 10 suggest yet another method of using a cruise missile 14. After the missile 14 is deployed the expandable exhaust cone 330 of the missile 14 moves from the collapsed to the expanded position in response to a pressure increase within the expandable substantially airtight tube 391.

The pressure sources 291, 392 in FIGS. 7-10 may be gas from bypass air, gas from heated exhaust air, gas from a pyrotechnic charge, or other matter sufficient to increase pressure to a predetermined value. The pressure sources 291, 392 are configured to provide a pressure increase to a predetermined pressure value.

The fixed cone segment 50 and the plurality of movable cone segments 60 of exhaust cones 230, 330 may include a plurality of locking features to lock the movable cone segments 60 in place upon reaching the expanded position. The locking features are believed to be unnecessary in the present disclosure and are not shown. The pressure within the cavity 292 and the expandable substantially airtight tube 391 of exhaust cone 230 and exhaust cone 330, respectively, is greater than the external pressure when the movable cone segments 60 are driven to the expanded position. Thus it is believed that the movable cone segments 60 will remain in the expanded position due to the difference in pressure.

Designs in accordance with the present disclosure may be incorporated on a missile which may be stowed in an internal weapons bay of an aircraft. The internal weapons bay may have limited space such that features of a missile cannot protrude from the internal weapons bay when the missile is stowed. If a protruding missile does not incorporate an expandable exhaust cone assembly a decrease in size of a component of the protruding missile may be necessary to allow the missile to be stowed in the internal weapons bay.

For example fuel capacity of the missile may need to be decreased. Decreased fuel capacity may result in decreased range of the missile.

Fuel capacity of a missile may be increased when the missile includes an expandable exhaust cone assembly relative to when the missile does not include an expandable exhaust cone assembly. The expandable exhaust cone assembly may shorten the missile when the missile is stowed in an internal weapons bay. The missile may be shortened such that any protrusion from the internal weapons bay that might otherwise be present when the assembly is in an expanded position is eliminated. The expandable exhaust cone assembly may expand and lengthen the missile when the missile is deployed such that the assembly influences the flow of combustion reaction gasses.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An expandable exhaust cone assembly adapted for use in an associated gas turbine engine, the expandable exhaust cone assembly comprising a fixed cone segment arranged around a central axis and adapted to be mounted to a structural component of the associated gas turbine engine, a plurality of movable cone segments configured to move from a collapsed position, associated with a first overall length of the expandable exhaust cone assembly along the central axis, to an expanded position, associated with a second overall length of the expandable exhaust cone assembly along the central axis that is longer than the first overall length, each of the plurality of movable cone segments nested within the fixed cone segment when the expandable exhaust cone assembly is in the collapsed position and arranged to extend outward of the fixed cone segment along the central axis when the expandable exhaust cone assembly is in the expanded position, and a cone mover configured to drive the plurality of movable cone segments from the collapsed position to the expanded position, and not from the expanded position to the collapsed position, in response to startup of the associated gas turbine engine, the cone mover comprising: a mover rod coupled to a turbine rotor of the associated gas turbine engine for rotation therewith, and a threaded plate coupled to the fixed cone segment, the mover rod having a threaded portion, the threaded portion engaged with the threaded plate when the cone segments are in the collapsed position and the threaded portion disengaged from the threaded plate when the cone segments are in the expanded position; or a gas pressure source in fluid communication with one of (a) a cavity comprising the plurality of movable cone segments and (b) an expandable substantially airtight tube connected to the plurality of movable cone segments, wherein the gas pressure source is operable to increase the pressure within the one of the cavity and the expandable substantially airtight tube above an external pressure outside the one of the cavity and the expandable substantially airtight tube.

2. The expandable exhaust cone assembly of claim 1, wherein the cone mover comprises the mover rod coupled to the turbine rotor of the associated gas turbine engine for rotation therewith, and the threaded plate coupled to the fixed cone segment, the mover rod having the threaded portion, the threaded portion enqaqed with the threaded plate when the cone segments are in the collapsed position and the threaded portion disengaged from the threaded plate when the cone segments are in the expanded position, wherein the mover rod is configured to drive the plurality of movable cone segments to the expanded position in response to rotation of the turbine rotor.

3. The expandable exhaust cone assembly of claim 2, wherein the cone mover includes an end cap, the end cap defining an end of the expandable exhaust cone assembly and the end cap not engaging the threaded portion of the mover rod so that the end cap is configured to allow rotation of the mover rod relative to the end cap.

4. The expandable exhaust cone assembly of claim 1, wherein the cone mover comprises the gas pressure source in fluid communication with the expandable substantially airtight tube, the expandable substantially airtight tube having an internal volume smaller than an internal volume of the expandable exhaust cone assembly, the expandable substantially airtight tube coupled to the plurality of movable cone segments and adapted to be coupled to the gas pressure source so that the expandable substantially airtight tube is configured to drive the plurality of movable cone segments to the expanded position in response to a gas pressure increase within the expandable substantially airtight tube.

5. The expandable exhaust cone assembly of claim 4, wherein the cone mover includes a lip coupled to the expandable substantially airtight tube and a non-expandable tube, the non-expandable tube is fixed relative to the fixed cone segment and has an internal volume smaller than the internal volume of the expandable substantially airtight tube and a sealable opening, the non-expandable tube is adapted to be coupled to the gas pressure source so that the non-expandable tube is configured to further drive the plurality of movable cone segments to the expanded position by being sealed by the lip and being released of the seal upon reaching a predetermined pressure value within the non-expandable tube in response to a gas pressure increase within the non-expandable tube from the gas pressure source.

6. The expandable exhaust cone assembly of claim 4, wherein the cone mover includes a pressure relief mechanism configured to vent gas when gas pressure in the expandable substantially airtight tube exceeds a predetermined value.

7. The expandable exhaust cone assembly of claim 6, wherein the pressure relief mechanism is selected from one of a pressure relief valve and a rupture disk.

8. The expandable exhaust cone assembly of claim 1, wherein the cone mover comprises the gas pressure source in fluid communication with the cavity, the cavity having a variable volume the boundaries of which are created in part by the plurality of movable cone segments so that the gas pressure source is configured to drive the plurality of movable cone segments to the expanded position in response to a pressure increase within the cavity.

9. The expandable exhaust cone assembly of claim 8, wherein the gas pressure source is selected from one of a gas from bypass air, a gas from exhaust air, and a gas from a pyrotechnic charge coupled to the associated gas turbine engine so that the pyrotechnic charge is configured to initiate startup of the associated gas turbine engine.

10. A cruise missile, the cruise missile comprising: a fuel supply tank, a gas turbine engine, the gas turbine engine comprising a compressor assembly, a combustor assembly, and a turbine assembly including a case and a rotor mounted in the case to rotate relative to the case, and an expandable exhaust cone assembly for use in the gas turbine engine, the expandable exhaust cone assembly comprising a fixed cone segment arranged around a central axis and mounted to a structural component of the gas turbine engine, a plurality of movable cone segments configured to move from a collapsed position, associated with a first overall length of the expandable exhaust cone assembly along the central axis, to an expanded position, associated with a second overall length of the expandable exhaust cone assembly along the central axis that is longer than the first overall length, and a cone mover configured to drive the plurality of movable cone segments from the collapsed position to the expanded position, and not from the expanded position to the collapsed position, in response to startup of the gas turbine engine, the cone mover comprising: a mover rod coupled to the rotor of the turbine assembly of the gas turbine engine for rotation therewith, and a threaded plate fixed relative to the fixed cone segment, the mover rod having a threaded portion, the threaded portion engaged with the threaded plate when the cone segments are in the collapsed position and the threaded portion disengaged from the threaded plate when the cone segments are in the expanded position; or a gas pressure source in fluid communication with one of (a) a cavity comprising the plurality of movable cone segments and (b) an expandable substantially airtight tube connected to the plurality of movable cone segments, wherein the gas pressure source is operable to increase the pressure within the one of the cavity and the expandable substantially airtight tube above an external pressure outside the one of the cavity and the expandable substantially airtight tube.

11. The cruise missile of claim 10, wherein the cone mover comprises the mover rod coupled to the rotor of the turbine assembly of the gas turbine engine for rotation therewith, and the threaded plate fixed relative to the fixed cone segment, the mover rod having the threaded portion, the threaded portion engaged with the threaded plate when the cone segments are in the collapsed position and the threaded portion disengaged from the threaded plate when the cone segments are in the expanded position, wherein the mover rod is configured to drive the plurality of movable cone segments to the expanded position in response to rotation of the rotor of the turbine assembly of the gas turbine engine.

12. The cruise missile of claim 11, wherein the cone mover includes an end cap, the end cap defining an end of the expandable exhaust cone assembly and the end cap not engaging the threaded portion of the mover rod so that the end cap is configured to allow rotation of the mover rod relative to the end cap.

13. The cruise missile of claim 10, wherein the cone mover comprises the gas pressure source in fluid communication with the expandable substantially airtight tube, the expandable substantially airtight tube having an internal volume smaller than an internal volume of the expandable exhaust cone assembly, the expandable substantially airtight tube coupled to the plurality of movable cone segments and adapted to be coupled to the gas pressure source so that the expandable substantially airtight tube is configured to drive the plurality of movable cone segments to the expanded position in response to a gas pressure increase within the expandable substantially airtight tube.

14. The cruise missile of claim 13, wherein the cone mover includes a lip coupled to the expandable substantially airtight tube and a non-expandable tube, the non-expandable tube is fixed relative to the fixed cone segment and has an internal volume smaller than the internal volume of the expandable substantially airtight tube and a sealable opening, the non-expandable tube is adapted to be coupled to the gas pressure source so that the non-expandable tube is configured to further drive the plurality of movable cone segments to the expanded position by being sealed by the lip and being released of the seal upon reaching a predetermined pressure value within the non-expandable tube in response to a pressure increase within the non-expandable tube from the gas pressure source.

15. The cruise missile of claim 13, wherein the cone mover includes a pressure relief mechanism configured to vent gas when gas pressure in the substantially airtight tube exceeds a predetermined value.

16. The cruise missile of claim 15, wherein the pressure relief mechanism is selected from one of a pressure relief valve and a rupture disk.

17. The cruise missile of claim 13, wherein the gas pressure source is selected from one of a gas from bypass air, a gas from exhaust air, and a gas from a pyrotechnic charge coupled to the rotor so that the pyrotechnic charge is configured to initiate rotation of the rotor to start the gas turbine engine.

18. The cruise missile of claim 10, wherein the cone mover comprises the gas pressure source in fluid communication with the cavity, the cavity having a variable volume the boundaries of which are created in part by the plurality of movable cone segments so that the gas pressure source is configured to drive the plurality of movable cone segments to the expanded position in response to a gas pressure increase within the cavity.

19. A method of using a cruise missile, the method comprising: stowing the cruise missile within an internal weapons bay of an aircraft, the cruise missile comprising a gas turbine engine including an expandable exhaust cone assembly, the expandable exhaust cone assembly comprising: a fixed cone segment arranged around a central axis and adapted to be mounted to a structural component of the gas turbine engine, a plurality of movable cone segments configured to move from a collapsed position, associated with a first overall length of the expandable exhaust cone assembly along the central axis, to an expanded position, associated with a second overall length of the expandable exhaust cone assembly along the central axis that is longer than the first overall length, and a cone mover configured to drive the plurality of movable cone segments from the collapsed position to the expanded position, and not from the expanded position to the collapsed position, in response to startup of the gas turbine engine, the cone mover comprising: a mover rod coupled to a turbine rotor of the gas turbine engine for rotation therewith, and a threaded plate coupled to the fixed cone segment, the mover rod having a threaded portion, the threaded portion engaged with the threaded plate when the cone segments are in the collapsed position and the threaded portion disengaged from the threaded plate when the cone segments are in the expanded position; or a gas pressure source in fluid communication with one of (a) a cavity comprising the plurality of movable cone segments and (b) an expandable substantially airtight tube connected to the plurality of movable cone segments, wherein the gas pressure source is operable to increase the pressure within the one of the cavity and the expandable substantially airtight tube above an external pressure outside the one of the cavity and the expandable substantially airtight tube; deploying the cruise missile from the internal weapons bay of the aircraft, and moving the expandable exhaust cone assembly from the collapsed position to the expanded position after deploying the cruise missile from the internal weapons bay of the aircraft, wherein the step of moving is performed by the cone mover.

\* \* \* \* \*